(12) United States Patent
Karube et al.

(10) Patent No.: US 7,747,684 B2
(45) Date of Patent: Jun. 29, 2010

(54) INFORMATION PROCESSING TECHNIQUE RELATING TO RELATION BETWEEN USERS AND DOCUMENTS

(75) Inventors: Yukihiro Karube, Kawasaki (JP); Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 10/925,133

(22) Filed: Aug. 25, 2004

(65) Prior Publication Data

US 2006/0041523 A1  Feb. 23, 2006

(30) Foreign Application Priority Data

Apr. 14, 2004 (JP) .............................. 2004-118455

(51) Int. Cl.
*G06F 17/30* (2006.01)
(52) U.S. Cl. .................. 709/204; 348/14.08; 348/14.16
(58) Field of Classification Search .................. 702/28; 709/204; 348/14.08, 14.16
See application file for complete search history.

(56) References Cited

U.S. PATENT DOCUMENTS

| | | | |
|---|---|---|---|
| 5,220,657 A | | 6/1993 | Bly et al. |
| 5,671,428 A | | 9/1997 | Muranaga et al. |
| 6,507,845 B1 | * | 1/2003 | Cohen et al. ................. 707/100 |
| 7,119,829 B2 | * | 10/2006 | Leonard et al. .......... 348/14.16 |
| 7,346,654 B1 | * | 3/2008 | Weiss ......................... 709/204 |
| 7,532,230 B2 | * | 5/2009 | Culbertson et al. ....... 348/14.08 |
| 2002/0169826 A1 | | 11/2002 | Yano et al. |
| 2004/0128350 A1 | * | 7/2004 | Topfl et al. .................. 709/204 |
| 2005/0097440 A1 | * | 5/2005 | Lusk et al. ............... 715/500.1 |
| 2005/0209812 A1 | * | 9/2005 | Decker et al. ............... 702/128 |

FOREIGN PATENT DOCUMENTS

| | | |
|---|---|---|
| EP | 0 371 603 A2 | 6/1990 |
| JP | 5-81323 | 4/1993 |
| JP | 07-234843 | 9/1995 |
| JP | 2001-331516 | 11/2001 |

OTHER PUBLICATIONS

Article entitled "VizGrid: Virtualized Collaboration Environment with 3D Images", by Matsukura et al., dated Dec. 2003.*
Article entitled "Advanced Information Sharing & Process Sharing Technology Group" by VizSquare, dated Nov. 9, 2003.*

(Continued)

*Primary Examiner*—Tim T. Vo
*Assistant Examiner*—Mahesh H Dwivedi
(74) *Attorney, Agent, or Firm*—Staas & Halsey LLP

(57) ABSTRACT

An information processing method of the invention comprises generating first relational data representing a relation between a document and a user by referring to access logs generated in response to accesses to documents; and generating second relational data representing a relation between documents, between users and between the documents and the users by using the first relational data. By the second relational data as stated above, the relation between the users though the documents can be represented. That is, it becomes easy for a user having referred to a specific document to recognize another user referring to the same specific document.

19 Claims, 14 Drawing Sheets

OTHER PUBLICATIONS

Article entitled "Development of a volume communication suite in VizGrid project" by Matsuzawa et al., dated Mar. 6, 2003.*

Article entitled "Advanced VizGrid: Development of teleimmersive collaboration environment" by Okuda et al., dated Sep. 2002.*

Article entitled "3d Tele-Collaboration over Internet2", dated Nov. 2, 2002, by Towles et al.*

Article entitled The GAZE Groupware System: Mediating Joint Attention in Multiparty Communication and Collaboration, dated Apr. 19, 1999, by Vertegaal.*

Article entitled "Freewalk" A 3d Virtual Space for Casual Meetings by Nakanishi et al., dated Jun. 1999.*

J.B. Kruskal, "Multidimensional Scaling by Optimizing Goodness of Fit to a Nonmetric Hypothesis", Psychometrika, vol. 29, No. 1, Mar. 1964, pp. 1-27.

Willy Picard, "Collaborative Document Edition in a Highly Concurrent Environment", Database and Experts Systems Applications, 2001, Proceedings, IEEE, Sep. 3, 2001, pp. 514-518, XP010558790.

First Notification of Office Action issued Dec. 1, 2009 in corresponding Japanese application No. 2004-118455 (4 pages) English translation (3 pages).

* cited by examiner

| | 201 | 202 | 203 |
|---|---|---|---|
| | USER ID | PASSWORD | IP ADDRESS |
| | USER a | aaaa | 192.1.1.1 |
| | USER b | bbbb | 192.1.1.2 |
| | USER c | cccc | 192.1.1.3 |
| | ⋮ | ⋮ | ⋮ |

FIG.2

| 301 | 302 | 303 | 304 | 305 |
|---|---|---|---|---|
| DATE | TIME | USER ID | DOCUMENT ID | OPERATION TYPE |
| 3/4 | 18:31:40 | a | 1 | REGISTRATION |
| 3/4 | 18:44:54 | b | 1 | REFERENCE |
| 3/5 | 08:50:03 | d | 3 | UPDATE |
| 3/5 | 09:11:29 | a | 3 | REFERENCE |
| ⋮ | ⋮ | ⋮ | ⋮ | ⋮ |
| | | | | |

FIG.3

|  | USER a | USER b | USER c | USER d |
|---|---|---|---|---|
| DOCUMENT 1 | 1 | 1 | 1 | 1 |
| DOCUMENT 2 | 1 | 1 | 0 | 0 |
| DOCUMENT 3 | 1 | 0 | 1 | 1 |

|  | USER a | USER b | USER c | USER d |
|---|---|---|---|---|
| USER a | 3 | 2 | 2 | 2 |
| USER b | 2 | 2 | 1 | 1 |
| USER c | 2 | 1 | 2 | 2 |
| USER d | 2 | 1 | 2 | 2 |

|  | DOCUMENT 1 | DOCUMENT 2 | DOCUMENT 3 |
|---|---|---|---|
| DOCUMENT 1 | 4 | 2 | 3 |
| DOCUMENT 2 | 2 | 2 | 1 |
| DOCUMENT 3 | 3 | 1 | 3 |

|  | USER a | USER b | USER c | USER d | DOCUMENT 1 | DOCUMENT 2 | DOCUMENT 3 |
|---|---|---|---|---|---|---|---|
| USER a | 3 | 2 | 2 | 2 | 1 | 1 | 1 |
| USER b | 2 | 2 | 1 | 1 | 1 | 1 | 0 |
| USER c | 2 | 1 | 2 | 2 | 1 | 0 | 1 |
| USER d | 2 | 1 | 2 | 2 | 1 | 0 | 1 |
| DOCUMENT 1 | 1 | 1 | 1 | 1 | 4 | 2 | 3 |
| DOCUMENT 2 | 1 | 1 | 0 | 0 | 2 | 2 | 1 |
| DOCUMENT 3 | 1 | 0 | 1 | 1 | 3 | 1 | 3 |

|  | USER a | USER b | USER c | USER d | DOCUMENT 1 | DOCUMENT 2 | DOCUMENT 3 |
|---|---|---|---|---|---|---|---|
| USER a | — | 2.00 | 1.73 | 1.73 | 4.58 | 3.87 | 3.24 |
| USER b | 2.00 | — | 2.24 | 2.24 | 4.58 | 2.65 | 4.24 |
| USER c | 1.73 | 2.24 | — | 0.00 | 4.47 | 3.74 | 3.61 |
| USER d | 1.73 | 2.24 | 0.00 | — | 4.47 | 3.74 | 3.61 |
| DOCUMENT 1 | 4.58 | 4.58 | 4.47 | 4.47 | — | 3.16 | 1.73 |
| DOCUMENT 2 | 3.87 | 2.65 | 3.74 | 3.74 | 3.16 | — | 3.00 |
| DOCUMENT 3 | 3.24 | 4.24 | 3.61 | 3.61 | 1.73 | 3.00 | — |

FIG.11

| OBJECT | X COORDINATE | Y COORDINATE | Z COORDINATE |
|---|---|---|---|
| USER a | 3.55 | 0.53 | 9.23 |
| USER b | -1.30 | 3.44 | -2.91 |
| USER c | 2.11 | 3.51 | -0.91 |
| USER d | 0.11 | -1.26 | -3.01 |
| DOCUMENT 1 | 4.93 | -3.46 | 6.23 |
| DOCUMENT 2 | -3.21 | 1.73 | 2.74 |
| DOCUMENT 3 | -0.73 | -1.25 | -0.99 |

FIG.12

| OBJECT | X COORDINATE | Y COORDINATE | Z COORDINATE | ADDITIONAL INFORMATION |
|---|---|---|---|---|
| USER a | 3.55 | 0.53 | 9.23 | DOCUMENT 1 |
| USER b | -1.30 | 3.44 | -2.91 | DOCUMENT 2 |
| USER c | 2.11 | 3.51 | -0.91 | DOCUMENT 1 |
| USER d | 0.11 | -1.26 | -3.01 | — |
| DOCUMENT 1 | 4.93 | -3.46 | 6.23 | 10 REFERENCE PERSONS |
| DOCUMENT 2 | -3.21 | 1.73 | 2.74 | 5 REFERENCE PERSONS |
| DOCUMENT 3 | -0.73 | -1.25 | -0.99 | 3 REFERENCE PERSONS |

FIG.13

INFORMATION PROCESSING TECHNIQUE RELATING TO RELATION BETWEEN USERS AND DOCUMENTS

TECHNICAL FIELD OF THE INVENTION

The present invention relates to an information processing technique associated with a relation between users and documents.

BACKGROUND OF THE INVENTION

Hitherto, a document created by a person was stored only in a private personal computer (PC), but at present, a file sharing system is used in which the document can be mutually used among persons belonging to the same department or performing the same work. Although the file sharing system is often realized as a basic function of an operating system (OS) such as, for example, Windows (trade mark of Microsoft Corp.), it is often implemented as a groupware system in which work environment in the office is integrated by combing communication tools such as mail, bulletin board system, and schedule management. Incidentally, here, a document file will be considered as a file.

In the document file sharing system, it can be said that not only documents can be mutually referred to among collaborative workers, but also mutual communication is realized through the documents. As means for communication, face-to-face conversation or telephone has highest real-time characteristics, and communication through the mail or documents has low real-time characteristics. However, the communication through the mail or documents has a merit that the same information can be transferred to many persons at once, and as the Internet becomes common, the chance of its use is increased.

The communication through documents starts from a point where ideas are collected into a document. The created document is stored in a document sharing system, and is made open to other users. Then, a collaborative worker reads the document, creates another document or updates the document, and stores it again in the document sharing system. By repeating this operation, the communication through the document is realized. In this communication, there is a feature that ideas of many persons are more easily reflected than creation of the document by one person, more ideas are packed, and the document with less error by mutual check is created. In this meaning, the merit by the collaborative work can be sufficiently utilized.

A problem of this communication is that a collaborative worker does not readily notice that the document is open to the public. Although the problem is resolved when it is notified to participants by mail or the like that the information has been registered or updated, this is not welcomed, because mails to be received are increasing in recent years. The user cannot deal with many mails and there is a possibility that he or she fails to read such a mail. Besides, because a sender restricts the range of notification, there is a problem that a person's potential chance of newly entering the communication is lost.

On the other hand, when persons are in the same office, it is possible to know, to some extent, who is interested in what and is in what work state now. This is due to informal communication made in the interim of the work. When persons are close to each other, the chance of coming in contact with each other, in addition to the work, is increased, and the conversation about topics other than the work is increased. When a person is usually exposed to such information, he or she notices that the information created by other collaborative workers can be utilized, and there occurs a chance that the information being shared is secondarily used. However, the environment in which the informal communication can be performed does not always exist.

As related art in this field, there is an instant message service in the Internet. Although various application programs for instant messages are used, the application program has a function to indicate whether another user is connected to the network, and the state of the user, for example, he or she is on the job or on a break. Besides, it is proposed to provide notification of the state of not only a person but also an object.

US2002-169826 discloses a system of providing notification of the state of a document such as update. JP-A-7-234843 discloses an example of a case where a document is used jointly. In this publication, when a collaborative work is performed through a shared document, there is adopted such a contrivance that the history of the collaborative work can be held in a place different from a storage area for the document. According to the system of this publication, as long as the place where an objective document is held is known, the state of the work relating to the document can be grasped.

As stated above, in the conventional document sharing system, the registered document can be merely referenced from the collaborative worker, and there is no contrivance to provide notification of the existence of the information. Besides, a relation between users through documents does not become clear.

SUMMARY OF THE INVENTION

An object of the invention is therefore to provide an information processing technique for representing a relation between users of documents through the shared documents.

Another object of the invention is to provide an information processing technique for accelerating communication between users through shared documents.

An information processing method of the invention comprises generating and storing into a first relational data storage, first relational data representing a relation between a document and a user by referring to an access log storage storing access logs generated in response to accesses to documents stored in a document storage; and generating and storing into a second relational data storage, second relational data representing a relation between documents, between users and between the documents and the users by using the first relational data stored in the first relational data storage.

By the second relational data as stated above, the relation between the users though the documents can be represented. That is, it becomes easy for a user having referred to a specific document to recognize another user referring to the same specific document. That is, it is possible to provide motivation to carry out communication with another user related through the specific document.

The information processing method may further comprise: converting the second relational data stored in the second relational data storage based on a specific user and a document being referenced by the specific user, and visualizing the converted second relational data. By doing so, it becomes easy for the specific user to recognize the document being referenced and another user being referring to the same document.

The information processing method may further comprise: using the second relational data stored in the second relational data storage to generate and store into a storage device, data of three-dimensional coordinates of the documents and the users. Although the second relational data is data including dimensions corresponding to the number of the users and the documents, when it is converted into data of the three-dimensional coordinates by a predetermined method, a human being can easily recognize the relation between the documents, between the users, and between the documents and users.

In addition, the information processing method may further comprise: by using data of three-dimensional coordinates of the documents and the users, converting the three-dimensional coordinates of the documents and the users included in the data of the three-dimensional coordinates of the documents and the users in accordance with a conversion mode to convert three-dimensional coordinates of a specific user and three-dimensional coordinates of a document being referenced by the specific user into specific three-dimensional coordinates; specifying a user and a document included in a display range based on the converted three-dimensional coordinates of the documents and the users; and generating display data of objects corresponding to the user and the document in the display range based on the converted three-dimensional coordinates of the documents and the users. By carrying out such coordinate conversion, the relation with another user through the document being referenced by the specific user based on the specific user can be displayed as a positional relation of the display objects (for example, icons). For example, when a user of a specific terminal is a specific user, based on himself or herself, another user associated through the document being referenced can be recognized.

The information processing method of the invention is carried out by, for example, combination of a computer and a program, and the program is stored in a storage medium or a storage device such as, for example, a flexible disk, a CD-ROM, a magneto-optical disk, a semiconductor memory, or a hard disk. There is also a case where the program is delivered as digital signals through a network or the like. Incidentally, intermediate processing results are temporarily stored in a storage device such as a main memory.

BRIEF DESCRIPTION OF THE DRAWINGS

FIG. 2 is a diagram showing an example of data stored in a user DB;
FIG. 3 is a diagram showing an example of data stored in a log DB;
FIG. 11 is a diagram showing an example of data representing a distance between documents, between users, and between users and documents;
FIG. 12 is a diagram showing an example of three-dimensional coordinate data;
FIG. 13 is a diagram showing an example of data transmitted from a server.

DETAILED DESCRIPTION OF THE PREFERRED EMBODIMENTS

1. First Embodiment

Figure 1:
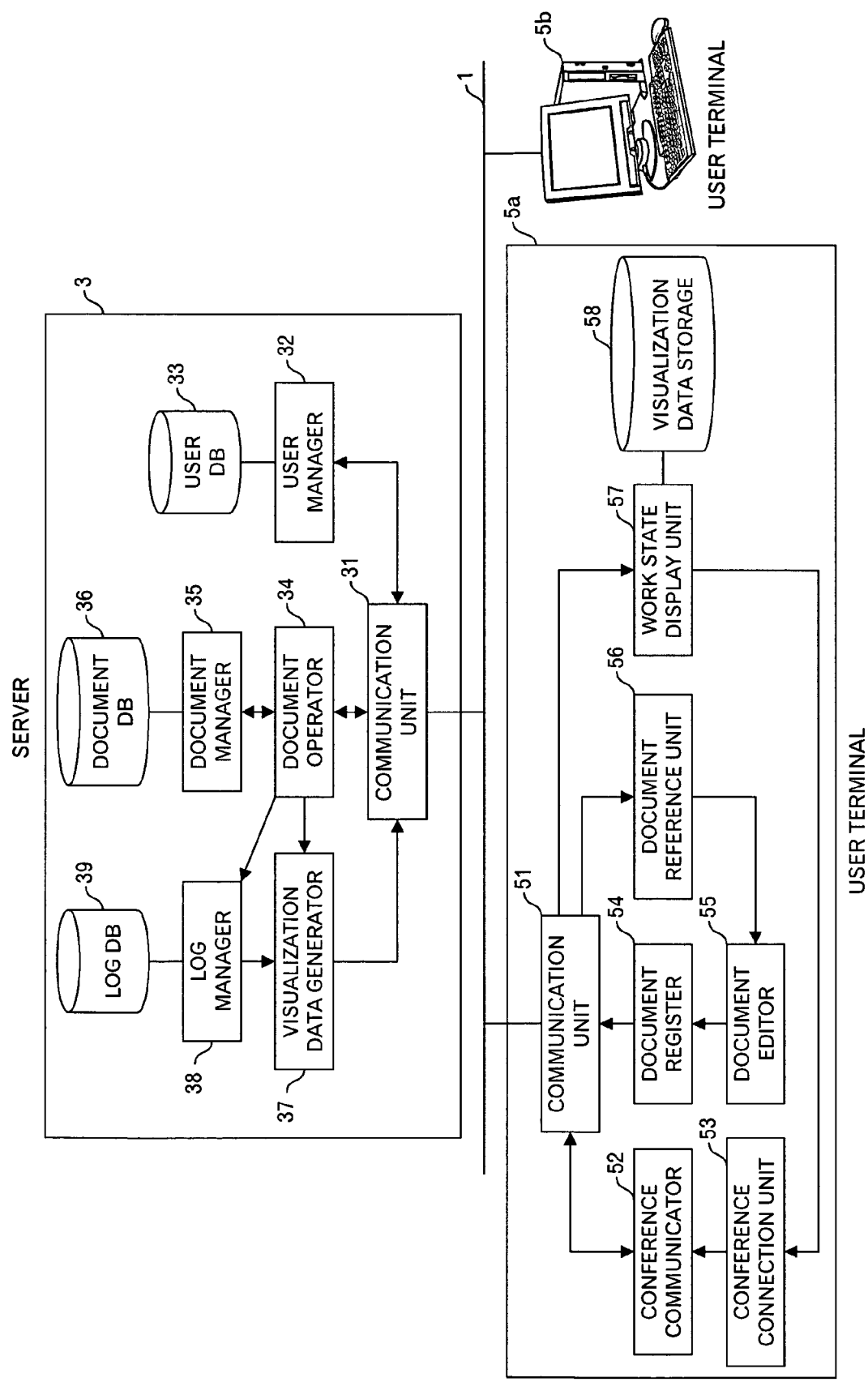
FIG. 1 is a functional block diagram of a first embodiment.

FIG. 1 is a system block diagram of this embodiment. For example, a network 1 as a LAN (Local Area Network) is connected with a server 3 and user terminals 5a and 5b. The number of user terminals is not limited to 2, and there is also a case where more user terminals are connected to the network 1. Besides, the network is not limited to the LAN, and there is also a case where it is the Internet.

The server 3 includes a communication unit 31 to perform communication with another computer through the network 1, a user DB 33 to store data concerning users allowed to access the server 3, a user manager 32 to perform an authentication processing and the like by referring to the user DB 33 and cooperating with the communication unit 31, a document DB 36 to store document files relating to collaborative work and the like, a document manager 35 to manage the document files and the like stored in the document DB 36, a document operator 34 to receive a request concerning a document operation such as registration, reference and update of a document file or the like from a user terminal through the communication unit 31 and to request the document manager 35 to perform the document operation, a log DB 39 to store log data of accesses to the document DB 36, a log manager 38 to carry out such a processing such as to add a record to the log DB 39 in response to an output from the document operator 34, and a visualization data generator 37 to acquire the log record stored in the log DB 39 through the log manager 38 and to generate visualization data by using the output from the document operator 34.

On the other hand, the user terminal 5a includes a communication unit 51 to perform communication with another computer through the network 1, a visualization data storage 58 to store visualization data received from the server 3, a work state display unit 57 to receive the visualization data from the server 3 and store it into the visualization data storage 58 and to generate and display data for visualizing a relation between documents and users by using the visualization data, a document reference unit 56 to carry out a reference processing of the document stored in the document DB 36 of the server 3 through the communication unit 51 in response to instructions from the user of the user terminal 5a, a document editor 55 to carry out a processing to edit the document referenced by the document reference unit 56 or to newly generate a document, a document register 54 to carry out a processing to register data of the updated or generated document to the document DB 36 of the server 3 through the communication unit 51, a conference connection unit 53 to carry out a processing for conference connection instructed by the user on the basis of a display by the work state display unit 57, and a conference communicator 52 to carry out conference communication with another user terminal through the communication unit 51 in response to a request from the conference connection unit 53. Another user terminal such as the user terminal 5b has basically the same configuration.

FIG. 2 shows an example of data stored in the user DB 33. The example of FIG. 2 includes a column 201 of user IDs, a column 202 of passwords, and a column 203 of IP addresses. That is, IDs and passwords used for authentication are stored for respective users, and IP addresses in the network 1 are stored and are used in a processing (especially conference connection) described later. The IP address is registered at the time of success in the authentication.

FIG. 3 shows an example of data stored in the log DB 39. The example of FIG. 3 includes a column 301 of dates, a column 302 of times, a column 303 of user IDs, a column 304 of document IDs, and a column 305 of operation types. That is, each time a user accesses a document stored in the document DB 36, a record concerning the access is stored. A log concerning the termination of a document operation, such as reference termination, may be further stored.

The basic processing of the system shown in FIG. 1 will be described in brief. In a case where a document is newly generated, the user of the user terminal 5a activates the document editor 55 and inputs the document. Such processing is the same as the processing of an application program such as a conventional word processor. When the document is completed, in response to the instruction from the user of the user terminal 5a, the document register 54 transmits the document data generated by the document editor 55 and a registration request to the server 3 through the communication unit 51. Incidentally, in response to the access from the user terminal 5a, the communication unit 31 inquires of the user manager 32 as to whether the access should be allowed. When the authentication processing for the user is not completed, an ID and a password are requested, and the authentication processing is carried out by the user manager 32. When the authentication is successful, an IP address is registered so as to correspond to the user ID. When the authentication is completed, the user manager 32 outputs access authorization to the communication unit 31. Then, the subsequent processing begins. The document operator 34 of the server 3 receives the document data and the registration request from the user terminal 5a through the communication unit 31. The document operator 34 outputs the user ID, the request document operation type (here, registration) and the document ID (file name or the like) to the log manager 38. In response to the output from the document operator 34, the log manager 38 adds data of date and time (month, day and hour) to the output from the document operator 34 and adds a record to the log DB 39. In addition, the document operator 34 outputs the document data to the document manager 35 so that it is registered in the document DB 36. The document manager 35 registers the document data in the document DB 36.

In a case where the user of the user terminal 5a refers to a specific document registered in the document DB 36, he or she instructs the document reference unit 56 to refer to the specific document. The document reference unit 56 transmits the reference request for the specific document to the server 3 through the communication unit 51. The document operator 34 of the server 3 receives the reference request for the specific document through the communication unit 31. Incidentally, when the authentication processing is not performed, the authentication processing is performed. The document operator 34 outputs a user ID, a requested document operation type (here, reference) and a document ID (file name of the specific document or the like) to the log manager 38 in response to the reception. In response to the output from the document operator 34, the log manager 38 adds data of the date and time (month, day and hour) to the output from the document operator 34, and adds a record to the log DB 39. The document operator 34 requests the data of the specific document from the document manager 35. The document manager 35 reads out the data of the specific document relating to the request from the document DB 36, and outputs it to the document operator 34. In addition, the document operator 34 transmits the data of the document received from the document manager 35 to the user terminal 5a through the communication unit 31. The document reference unit 56 of the user terminal 5a receives the data of the specific document from the server 3 through the communication unit 51, and outputs it to the document editor 55. The document editor 55 displays the received data of the specific document on the display device.

Further, in a case where the user of the user terminal 5a updates a document, he or she updates the document by the document editor 55. In a case where the update contents should be fixed, an update registration instruction is inputted to the document editor 55. In accordance with the update registration instruction, the document register 54 transmits the data of the updated document and an update request to the server 3 through the communication unit 51. The document operator 34 of the server 3 receives the document data and the update request from the user terminal 5a through the communication unit 31. Then, the document operator 34 outputs a user ID, a requested document operation type (here, update) and a document ID (file name or the like) to the log manager 38 in response to the reception. In response to the output from the document operator 34, the log manager 38 adds data of the date and time (month, day and hour) to the output from the document operator 34, and adds a record to the log DB 39. The document operator 34 outputs the data of the updated document to the document manager 35 so that it is registered in the document DB 36. The document manager 35 registers the data of the updated document in the document DB 36.

Figure 4:
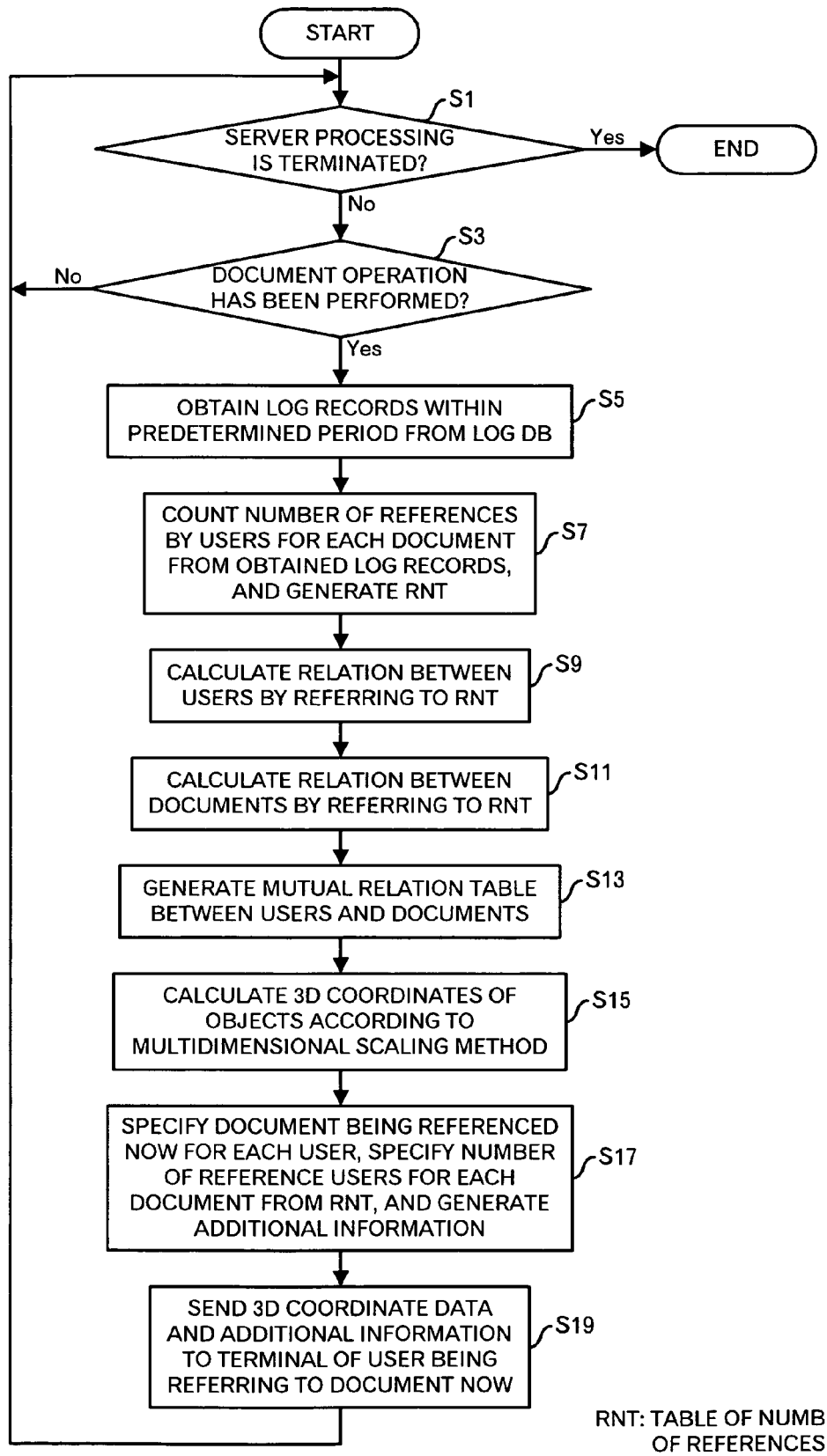
FIG. 4 is a diagram showing an example of a processing flow at a server side.
Figures 5, 6, 7:
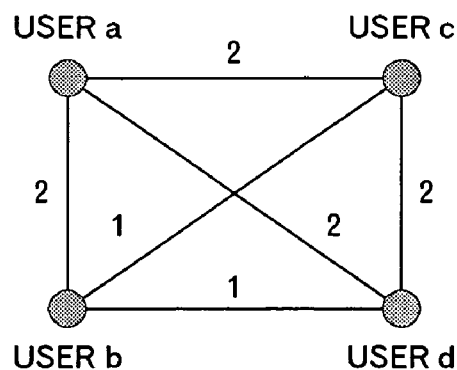
FIG. 5 is a diagram showing an example of a table of the number of references.
FIG. 6 is a diagram showing an example of data representing a relation between users.
FIG. 7 is a diagram showing an example of a graph representing a relation between users.

On the premise that the processing as stated above is normally carried out, the processing of this embodiment will be described with reference to FIGS. 4 to 22. First, the processing of the server 3 will be described using the processing flow shown in FIG. 4. The server 3 repeats the processing of step S3 to S19 described below until the processing is terminated (step S1). First, the visualization data generator 37 judges whether a document operation has been performed in response to the output from the document operator 34 (step S3). The document operator 34 outputs such notification that for example, a reference processing by a specific user has been performed, and the reference by the specific user has been terminated. In a case where there is no document operation, the processing returns to the step S1. On the other hand, in a case where it is judged that the document operation has been performed, the visualization data generator 37 requests the log manager 38 to read out the log records in a predetermined period from the log DB 39, and obtains the log records in the predetermined period from the log manager 38 (step S5). Because of the predetermined period from the present time point, the extracted log records vary each time the step S5 is carried out. That is, data expressing a newer state is used according to new log records. The visualization data generator 37 counts the number of references by users for each document from the obtained log records, and generates a table of the number of references (step S7). FIG. 5 shows an example of the table of the number of references. In the table of the number of references, the number of times each user has carried out access in the predetermined period is registered for each document. However, for the purpose of simplifying the following description, in the example of FIG. 5, it is registered whether or not each user has carried out access (reference or registration) in the predetermined period for each document. Here, "1" denotes that there is access, and "0" denotes that there is no access. In a case where the table of the number of references as stated above is used, three-dimensional coordinates calculated below are not changed very much. However, the accurate number of times may be counted in accordance with the principle. The table of the number of references is stored in the storage device such as the main memory of the server 3.

The visualization data generator 37 refers to the table of the number of references, calculates the relation between users, and stores it into the storage device such as the main memory (step S9). The table of the number of references shown in FIG. 5 is expressed in a matrix as follows:

[Expression 1]

$$A = \begin{pmatrix} 1 & 1 & 1 & 1 \\ 1 & 1 & 0 & 0 \\ 1 & 0 & 1 & 1 \end{pmatrix}$$

Then, when the matrix A is multiplied by the transposed matrix of the matrix A from the left, a matrix expressing the relation between the users is calculated.

[Expression 2]

$$^tA \times A = \begin{pmatrix} 1 & 1 & 1 \\ 1 & 1 & 0 \\ 1 & 0 & 1 \\ 1 & 0 & 1 \end{pmatrix} \times \begin{pmatrix} 1 & 1 & 1 & 1 \\ 1 & 1 & 0 & 0 \\ 1 & 0 & 1 & 1 \end{pmatrix} = \begin{pmatrix} 3 & 2 & 2 & 2 \\ 2 & 2 & 1 & 1 \\ 2 & 1 & 2 & 2 \\ 2 & 1 & 2 & 2 \end{pmatrix} \quad (1)$$

The matrix expressed by the Expression (1) represents the relation between the users as shown in FIG. 6, and more specifically represents the relation as shown in FIG. 7. In FIG. 6, a user a, a user b, a user c and a user d are arranged in sequence vertically and horizontally, and relations between the user a and the user b, the user a and the user c, the user a and the user d, . . . are expressed by numerals. When the numeral between the same persons is neglected, the relations among the four persons as shown in FIG. 7 can be indicated.

Next, the visualization data generator 37 refers to the table of the number of references, calculates the relation between documents, and stores it into the storage device such as the main memory (step S11). When the matrix A expressing the table of the number of references in a matrix, which is shown in FIG. 5, is multiplied by the transposed matrix of the matrix A from the right, a matrix expressing the relation between the documents is calculated.

[Expression 3]

$$A \times {}^tA = \begin{pmatrix} 1 & 1 & 1 & 1 \\ 1 & 1 & 0 & 0 \\ 1 & 0 & 1 & 1 \end{pmatrix} \times \begin{pmatrix} 1 & 1 & 1 \\ 1 & 1 & 0 \\ 1 & 0 & 1 \\ 1 & 0 & 1 \end{pmatrix} = \begin{pmatrix} 4 & 2 & 3 \\ 2 & 2 & 1 \\ 3 & 1 & 3 \end{pmatrix} \quad (2)$$

Figures 8, 9, 10:
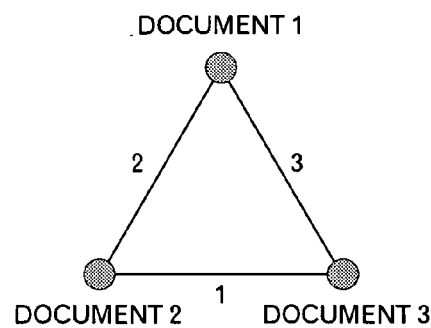
FIG. 8 is a diagram showing an example of data representing a relation between documents.
FIG. 9 is a diagram showing an example of a graph representing a relation between documents.
FIG. 10 is a diagram showing an example of data representing a relation between documents, between users, and between users and documents.

The matrix expressed by the Expression (2) represents the relation between the documents as shown in FIG. 8, and more specifically represents the relation as shown in FIG. 9. In FIG. 8, a document 1, a document 2, and a document 3 are arranged in sequence horizontally and vertically, and the relations between the document 1 and the document 2, the document 1 and the document 3, and the document 2 and the document 3 are expressed by numerals. When the numeral between the same documents is neglected, the relation between the documents as shown in FIG. 9 can be expressed.

Then, the visualization data generator 37 uses the data calculated at the steps S9 and S11 to generate a mutual relation table between users, between documents, and between documents and users, and stores it into the storage device such as the main memory (step S13). FIG. 10 shows the mutual relation table at a first stage. In the example of FIG. 10, the user a, the user b, the user c, the user d, the document 1, the document 2, and the document 3 are arranged vertically and horizontally in this order. A portion A of FIG. 10 is the same as FIG. 6, a portion B is the same as FIG. 8, a portion C is the same as FIG. 5, and a portion D is the same as what is obtained by inverting the rows and columns of FIG. 5.

As is understood from FIG. 10, because the number of elements is 7, the mutual relation is expressed in a seven-dimensional space. A mutual distance in this space expresses the similarity of the respective elements, and as the distance becomes small, the relation becomes deep. When q is a dimension number, this distance is calculated by a following expression:

[Expression 4]

$$D_{ij} = \sqrt{\sum_{q=1}^{N}(x_{iq} - x_{jq})^2}$$

Where, $x_{iq}$ expresses a value of an i-th element at the dimension number q. When distances in the state of FIG. 10 are calculated, values as shown in FIG. 11 are calculated. FIG. 11 shows a mutual relation table at a second stage. The relation among the elements in the seven-dimensional space can be expressed in this way. Accordingly, by exhibiting the table as shown in FIG. 11 to the user as it is, the relation between the documents, between the users, and between the users and documents may be indicated.

However, in general, the user cannot easily recognize the seven-dimensional space. When the number of elements is increased, the number of dimensions is increased, and it becomes more difficult to intuitively grasp the relation.

Then, in this embodiment, mapping to the three-dimensional space is performed so that a person can intuitively understand. As an example of the mapping, the visualization data generator 37 calculates three-dimensional coordinates of objects (documents and users) by the multi-dimensional scaling method, and stores them in, for example, the storage device such as the main memory of the sever 3 (step S15).

This multi-dimensional scaling method is well known and is disclosed in, for example, "Kruskal, J. B. Multidimensional Scaling by optimizing goodness of fit to a nonmetric hypothesis, Psychometrika, 29, 1964, pp 1-27". The space of the mapping destination may be a two-dimensional space.

For example, data as shown in FIG. 12 is calculated. The example of FIG. 12 includes a column 1201 of objects as the users and the documents, a column 1202 of X-coordinates, a column 1203 of Y-coordinates, and a column 1204 of Z-coordinates. As stated above, data of the three-dimensional coordinates is generated for each object.

By doing so, when both the user a and the user b refer to the same document (for example, the document 1 and the document 2), the user a and the user b are expressed at the same coordinates. That is, the distance between the users is "0". Similarly, when the document 1 and the document 2 are referenced by only the user a and the user b, the document 1 and the document 2 are expressed at the same coordinates. On the contrary, in a case where there is no document to which both the user a and the user b refer, the distance between the user a and the user b becomes infinite. The distance between the objects (users and documents) mapped into the three-dimensional space is determined by the relation of each object with respect to the other object, and two objects having similar relation are arranged to be close to each other.

As described below, in this embodiment, because the relation between the objects is also expressed by directions or the like of the objects, in order to facilitate the understanding of such additional information, the three-dimensional coordinates, not the two-dimensional coordinates, are calculated.

Further, the visualization data generator 37 specifies the document being referenced now for each user, specifies the number of reference persons for each document from the table of the number of references, generates additional information from such information, and stores it into the storage device such as the main memory of the server 3 (step S17). In a case where records such as reference termination are registered in the log DB 39, the document being referenced now is specified for each user by referring to the data stored in the log DB 39. The document may be specified on the basis of the output concerning the document operation from the document operator 34.

Then, the visualization data generator 37 transmits the three-dimensional coordinate data and the additional information to the user terminal of the user referring to the document now (step S19). The three-dimensional coordinate data, the additional information or both of them may be transmitted only in the case where there is a difference as compared with the three-dimensional coordinate data and the additional information transmitted just before. FIG. 13 shows an example of the data to be transmitted. FIG. 13 shows a state in which the additional information of the respective users and the respective documents is added to the three-dimensional coordinate data shown in FIG. 12. That is, a column 1205 of the additional information is added. Incidentally, there is also a case where not the number of reference persons, but the number of reference times is included. Further, with respect to the document, there is also a case where data representing the existence of the update during the predetermined period is also added as the additional information. Incidentally, the processing returns to the step S1.

The data as the basis to exhibit the relation between the documents, between the users, and between the users and documents are generated by the processing as stated above, and are transmitted to the user terminal. Incidentally, although the processing described below other than the display can also be performed at the side of the server 3, when the load of the network 1 is considered, it is better to perform the processing described below at the user terminal side by giving the data transmitted at step S19 to, for example, an applet to realize the work state display unit 57 described below.

Next, the processing of the user terminal 5a, especially the processing of the work state display unit 57 will be described with reference to FIGS. 14 to 20. The work state display unit 57 repeats steps S23 to S31 described below until the work state display is terminated (step S21). First, the work state display unit 57 judges whether the three-dimensional coordinate data or the additional information is received through the communication unit 51 (step S23). In the case where the three-dimensional coordinate data and the additional information are not received, the processing returns to the step S21. On the other hand, in the case where the three-dimensional coordinate data or the additional information is received, it stores the received data in the visualization data storage 58. By referring to the three-dimensional coordinate data and the additional information stored in the visualization data storage 58, it carries out the coordinate conversion to arrange the user of the user terminal at the origin, and to dispose the document to which the user is referring at a predetermined position (0, 0, z) (z is a predetermined real number), carries out the coordinate conversion for the remaining objects (i.e. documents and users), and stores the results into the storage device such as the main memory (step S25). This processing will be described with reference to FIGS. 15($a$) and ($b$). First, as shown in FIG. 15($a$), the user of the user terminal 5a is displaced in parallel from the coordinates (xa, ya, za) to (0, 0, 0). Other objects are also displaced in parallel in compliance with this displacement. Thus, the document being referenced by the user is displaced in parallel from the coordinates (x1, y1, z1) to (x1', y1', z1'). Next, as shown in FIG. 15($b$), the document being referenced by the user is rotated from the coordinates (x1', y1', z1') to a point on the Z axis. That is, (x1', y1', z1') is rotated to (0, 0, z1"). Other objects are also rotated in compliance with this rotation. Such data is stored in the visualization data storage 58.

Figure 16:
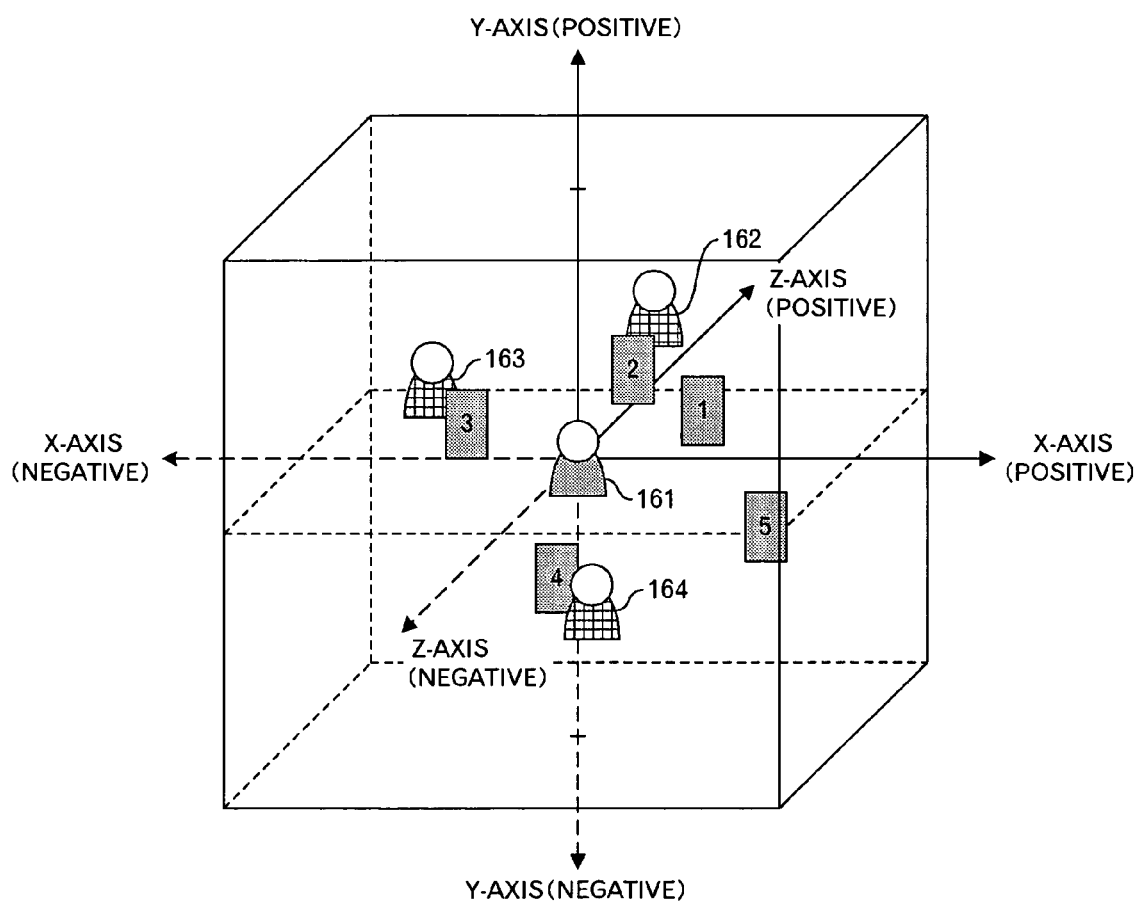
FIG. 16 is a diagram showing an example of a three-dimensional space.

When such processing is performed, for example, a three-dimensional space as shown in FIG. 16 is formed. FIG. 16 shows an example in which three users and five documents exist. The user of the user terminal 5a corresponds to a user icon 161 and is referring to the document 2, and accordingly, the document icon 2 is arranged on the Z-axis. User icons 162 to 164 corresponding to the other users, and a document icon 1 and document icons 3 to 5 corresponding to the other documents are arranged at coordinate positions calculated at the step S25. Incidentally, in FIG. 16, a rectangular parallelepiped indicated by a solid line is shown to make the three-dimensional space understandable. Because the user icons and the document icons are not selected at this stage, they are shown as temporal ones.

Next, the work state display unit 57 selects objects (document or user) having coordinates in a display range (step S27). In the following, a processing is carried out to display the state of the three-dimensional space, which is seen from the user object positioned at the origin, on the display device. Therefore, only the objects in the display range are processed as objects to be displayed. Various methods can be used as this method. As a simple method, because the user is directed in the positive direction of the Z-axis, only the objects whose Z-coordinate is positive are selected as the displayed objects. Further, it is also possible to add additional conditions, for example, the value of the Z-coordinate is limited within a predetermined range, or the value of the Y-coordinate is limited to a positive one. According to this processing, because judgment can be immediately made from the coordinate value of each object, a processing load is low. As another method, a viewing angle from a user object positioned at the origin is set, and only objects falling in the viewing angle are selected as display objects. Unless an angle between the user object positioned at the origin and another object is calculated, it is not possible to make a judgment whether the object falls in the viewing angle. Therefore, the processing load is relatively high. In this case, it is also possible to set a distance from the origin as an additional condition. Incidentally, although objects (users and documents) positioned behind this user are not displayed as stated above, this is because such objects are hardly related to this user.

Figure 17A:
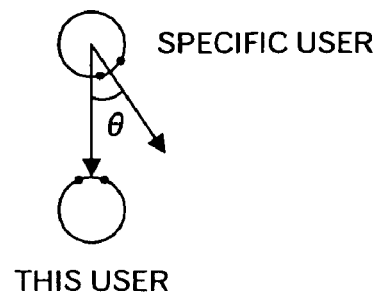
FIG. 17A is a diagram for explaining an angle of a user.
Figure 17B:
FIG. 17B is a diagram showing kinds of icons.

Next, the work state display unit 57 determines icons of selected objects (documents or users) on the basis of the additional information stored in the visualization data storage 58 (step S29). The user icon is determined by, for example, a following processing. (1) On the basis of the additional information, a document being referenced by a specific user now is specified. (2) Assuming that the specific user is directed in the direction of the document object being referenced now, an angle θ between a vector from the specific user to the document object being referenced now and a vector from the specific user to the origin (position of this user) is specified. This example will be described with reference to FIG. 17A. FIG. 17A shows this user and the specific user. When the specific user is referring to a document (not shown), a vector from the specific user to the document being referenced can be specified. Because this user sees the state where the specific user is referring to the document, a line of sight becomes a vector from this user to the specific user. However, in order to specify the angle θ, it is better to calculate an angle between a vector from the specific user to this user and a vector from the specific user to the document being referenced. (3) When the angle θ is specified, the icon corresponding to that is specified. For example, as shown in FIG. 17B, several icons are prepared. In the example of FIG. 17B, an icon for the front (0°), an icon for 1 to 60°, an icon for 61 to 120°, and an icon for 121 to 180° (and a user having no document being referenced) are previously prepared, and an icon corresponding to the angle θ is specified. By this processing, display data of the specific user is prepared.

Incidentally, it is also possible that three-dimensional object data of a user is prepared and is directed in the direction of the document being referenced, and the display data is rendered.

Figure 18A:
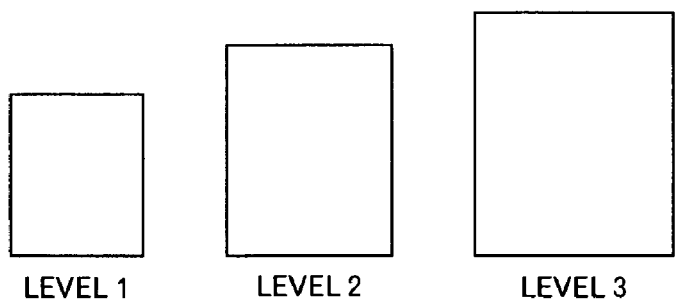
FIG. 18A is a diagram showing a change in size of a document icon according to the number of references.
Figure 18B:
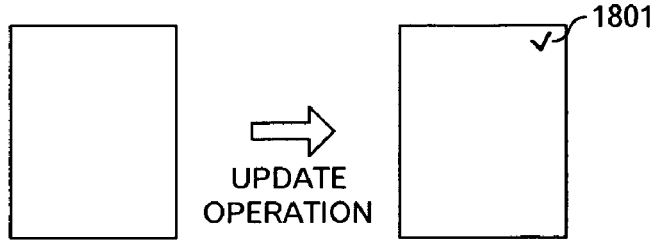
FIG. 18B is a diagram showing an example of an update mark on the basis of an update operation.

With respect to an icon of a document, the size of the icon is determined according to the value of the number of reference persons (or the number of reference times). As shown in FIG. 18A, icons for documents are classified into levels, for example, an icon for a document whose number of reference persons is "1", an icon for a document whose number of reference persons is "2" to "5", and an icon for a document whose number of reference persons is "6" or higher. Thus, the size is made large stepwise. In the case where data of a document updated within a predetermined period is included in the additional information, as shown in FIG. 18B, a mark 1801 to specify the updated document may be added to the icon. By this processing, the display data of the document is prepared.

Figure 19:
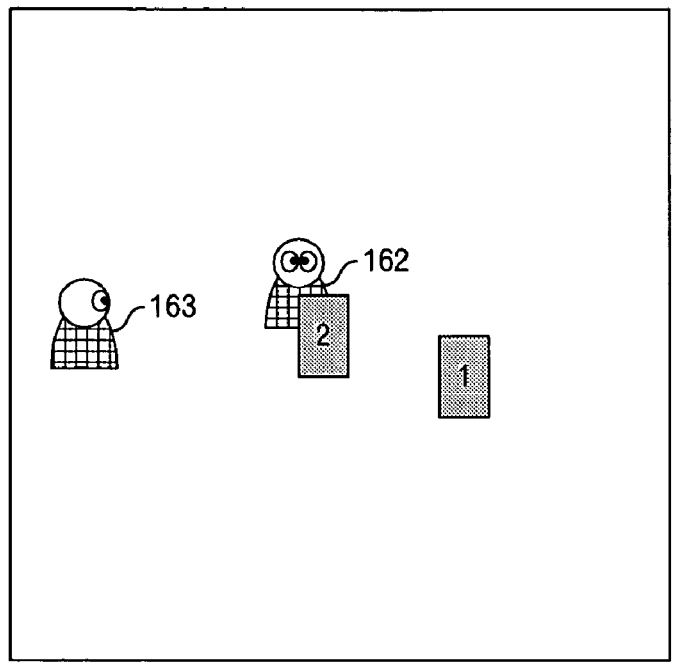
FIG. 19 is a diagram showing a first display example.

The work state display unit 57 displays specified icons for selected objects as a state seen from this user arranged at the origin on the display device (step S31). For example, an object having the largest Z-coordinate is first drawn, and as the Z-coordinate becomes small, the object is displayed later, so that simple hidden surface elimination can be performed. For example, the display as shown in FIG. 19 is performed. The example of FIG. 19 shows a state seen from the user arranged at the origin in the state of the three-dimensional space shown in FIG. 16. That is, the document icon 2 of the document 2 being referenced is arranged at the front, and the user icon 162 of the user referring to the same document 2 is arranged behind the document icon 2 in the form of looking to the front. That is, the icon faces this user. By this display, it is possible to easily recognize that the user of the user icon 162 refers to the same document 2. The user icon 163 of the user referring to the document 1 is displayed in the form of looking to the side. Here, the size of the document icon is not considered.

Incidentally, not the state seen from this user, but, for example, a state of a three dimensional space seen from a position having a predetermined coordinate on the Y-axis as a viewpoint, may be displayed. Such a display method is well known in the field of computer graphics, and various processing methods and display methods can be adopted.

Then, the processing returns to the step S21. That is, the aforementioned processing flow is carried out each time the three-dimensional coordinates of the user or the document is received, or each time the additional information is received in a case where the document being referenced by the user is changed, or in a case where the number of reference persons or the number of reference times is changed. In the case where only the additional information is received, the steps S25 and S27 may be skipped.

Figure 14:
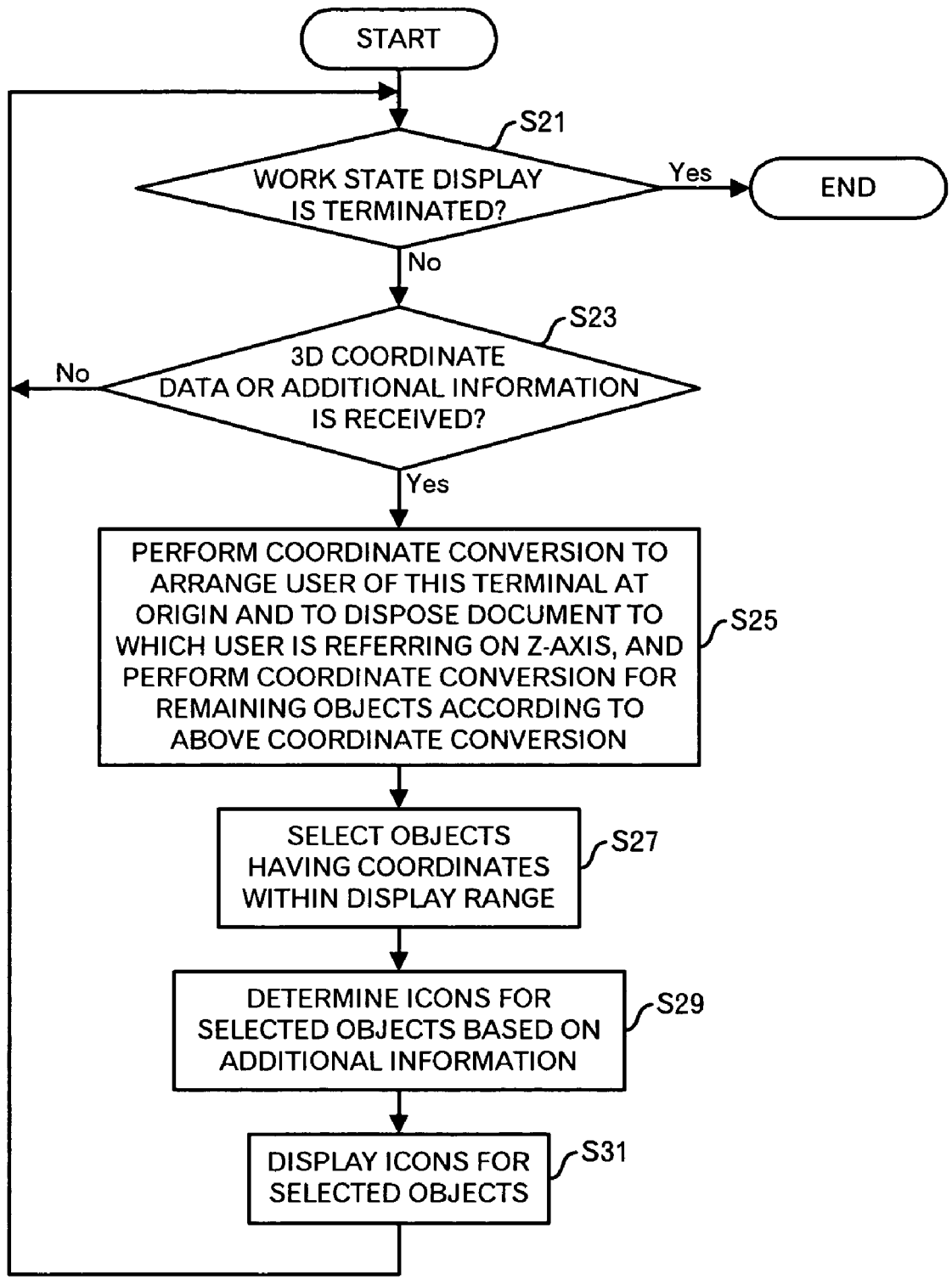
FIG. 14 is a diagram showing an example of a processing flow at a terminal side.
Figure 15A:
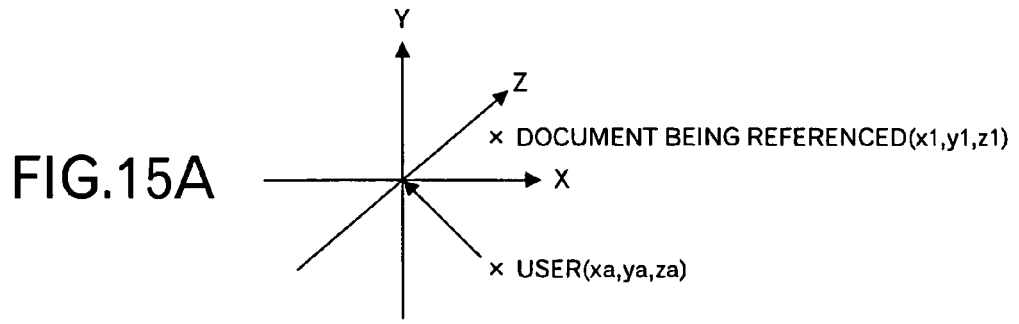
FIGS. 15A and 15B are schematic diagrams for explaining coordinate conversion.
Figure 15B:
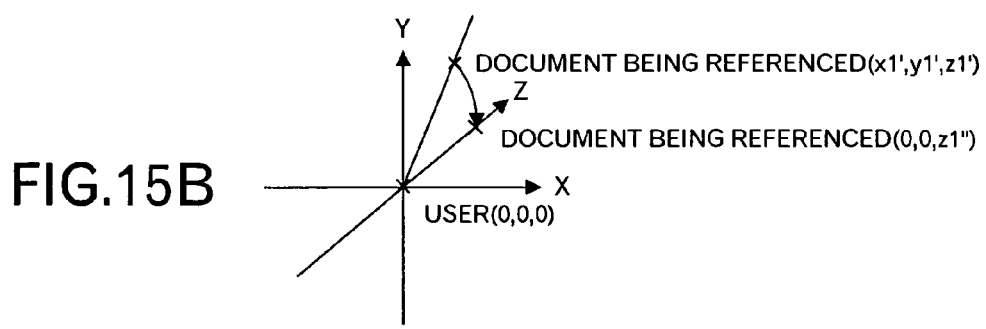
Figure 20:
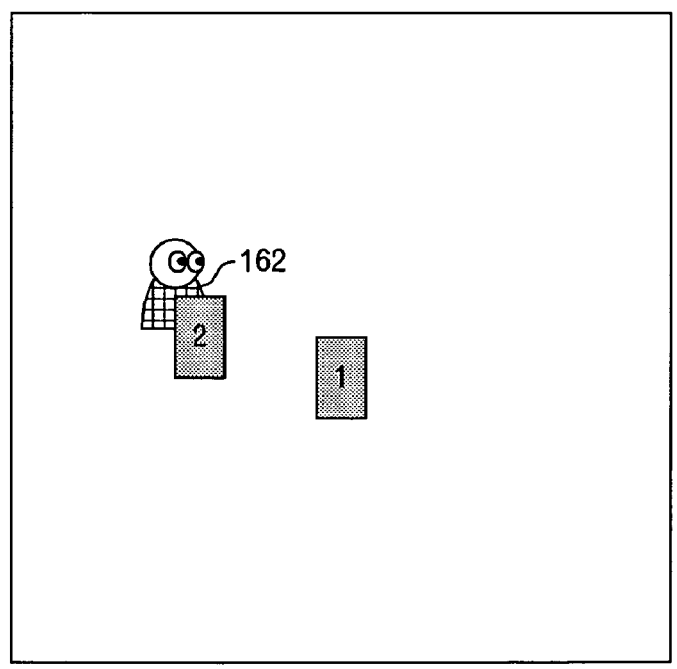
FIG. 20 is a diagram showing a second display example.

For example, in the case where the user of the user terminal 5a instructs the document reference unit 56 to refer to another document (for example, document 1), the document reference unit 56 receives the data of the document 1 from the server 3 and displays it, the work state display unit 57 performs the processing shown in FIG. 14 and displays a screen as shown in FIG. 20. That is, in response to that the document being referenced is changed from the document 2 to the document 1, the screen as shown in FIG. 19 is changed to the screen as shown in FIG. 20. In FIG. 20, the document icon 1 of the document 1 is arranged at the front. As stated above, when the document being referenced is changed, the additional information is changed, and the document object seen by this user at the front in the three-dimensional space is changed, so that the display is also changed in response thereto.

For example, in the case where the additional information indicating that the number of reference persons to a specific document or the number of reference times is changed, is received, the size of the icon is changed. In the case where the additional information indicating that update registration to a specific document is performed, is received, a processing of displaying an icon to which an update mark is attached is performed. Further, in the case where such a reference state that three-dimensional coordinates are changed is stored in the log DB 39, the state in the three-dimensional space as shown in FIG. 16 is also changed.

When the size of the icon is changed according to the number of reference persons or the number of reference times, it becomes possible to find out a document whose number of reference persons or number of reference times is relatively small. For example, it becomes also possible to specify the document whose number of reference persons or number of reference times is small as the document whose contents should be updated.

Figure 21:
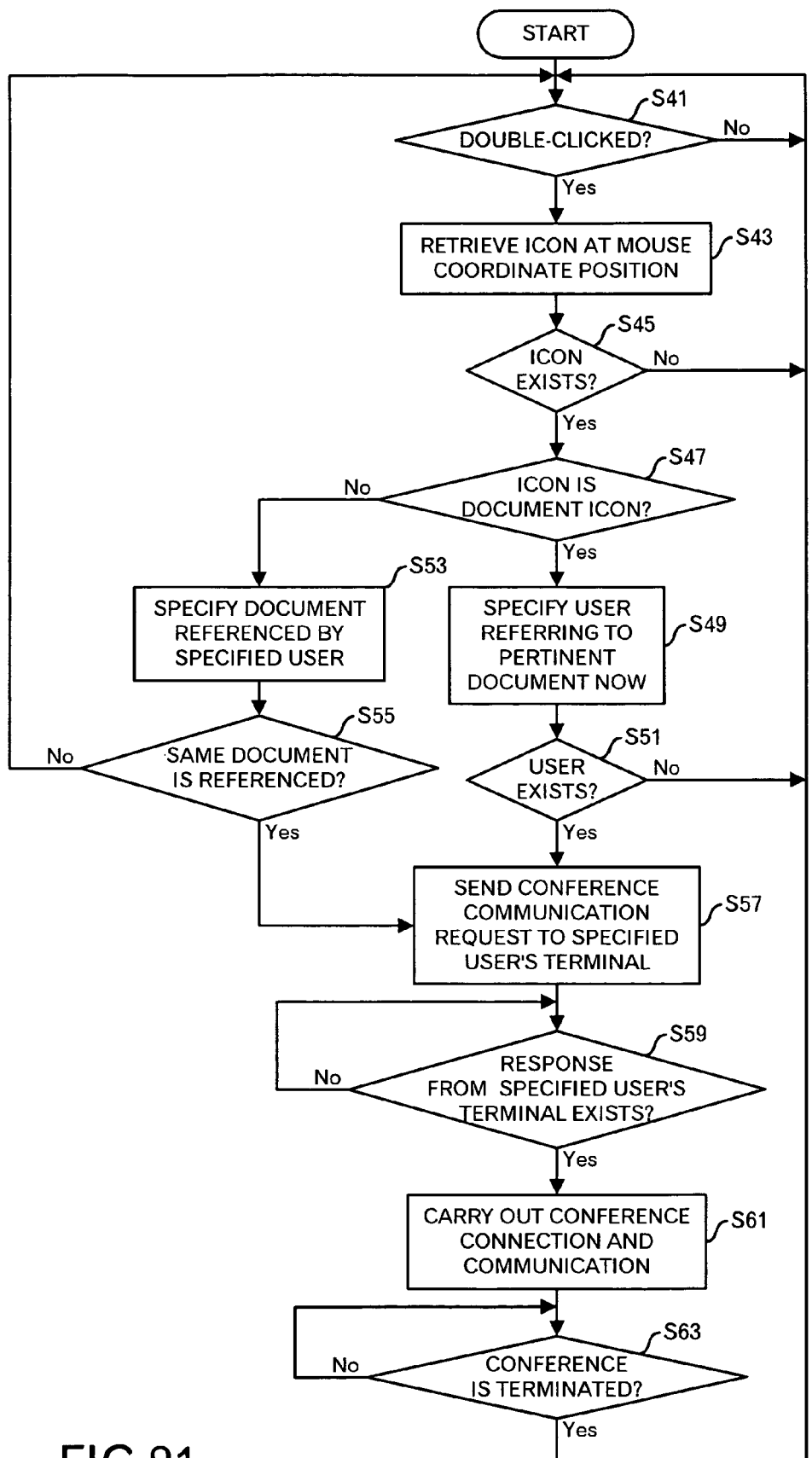
FIG. 21 is a diagram showing a processing flow at the time of conference connection.
Figure 22:
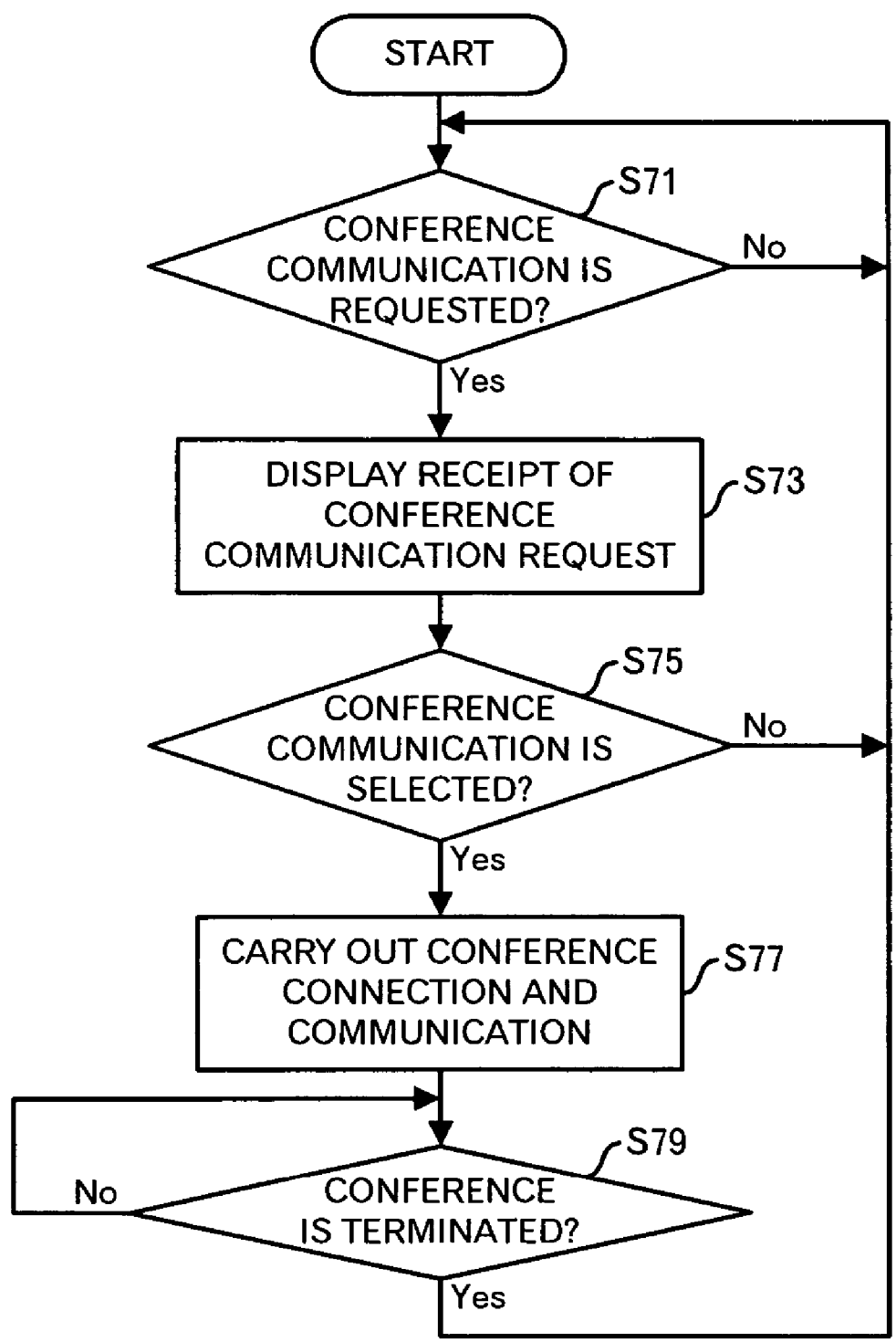
FIG. 22 is a diagram showing a processing flow of a response processing to a conference connection request.

Next, a processing when communication with the user terminal of another user is performed, which is instructed from the display by the work state display unit 57, will be described with reference to FIGS. 21 and 22. As a premise, it is assumed that a double click is an input to request conference communication. First, the user of the user terminal 5a double-clicks the document icon or the user icon. The work state display unit 57 judges whether or not the input from the user is the double click (step S41). In the case where the input is judged not to be the double click, a standby state continues until a double click is performed. On the other hand, in the case where the input is judged to be the double click, an object at a mouse coordinate position where the double click is performed is retrieved (step S43). Then, it judged whether there is an icon (step S45). In the case where it is judged that there is no icon, the processing returns to the step S41. On the other hand, in the case where it is judged that there is an icon, it is judged whether the double-clicked icon is a document icon (step S47). In the case where the double-clicked icon is the document icon, the user being referring to the document now is specified on the basis of the additional information stored in the visualization data storage 58 (step S49). It judges whether or not there is a user who is referring to the document now (step 51). In the case where it is judged that there is no user who is referring to the document now, the processing returns to the step S41. On the other hand, in the case where it is judged that there is a user who is referring to the document now, the conference connection unit 53 obtains data of the user terminal of the specified user through the conference communicator 52 and the communication unit 51, and transmits the conference connection request to the user terminal of the specified user (step S57). The data of the user terminal of the specified user is, for example, an IP address, and the IP address request including the ID of the specified user is transmitted to the server 3 through the conference communicator 52 and the communication unit 51. The communication unit 31 of the server 3 outputs the IP address request including the ID of the specified user to the user manager 32. The user manager 32 uses the ID of the specified user to search the user DB 33, reads out the data of the IP address, and transmits as the response the IP address data to the user terminal 5*a* through the communication unit 31. Because the document is being referenced now, the IP address is specified without fail. However, in the case where the processing reaches this step via the step S53 as described below, there is a case where the IP address can not be specified. In that case, an error is sent to the user terminal 5*a*. The conference connection unit 53 of the user terminal 5*a* having received the error carries out an error display. When receiving the IP address data, the conference connection unit 53 of the user terminal 5*a* uses the IP address to transmit the conference connection request to the user terminal of the specified user.

A standby state continues until a response is issued by the opposite user terminal (step S59), and when the response is received, the conference communicator 52 carries out conference connection and communication (step S61). With respect to the conference connection and communication, any conventional method may be used, and because this is not the main part of this embodiment, its description will be omitted here. Until conference termination is instructed by the user (step S63), the conference communicator 52 performs the processing. In the case where the conference termination is instructed by the user (including a case where the conference termination is instructed by the user communicating with this user and the link is cut off, and the like), the processing returns to the step S41.

On the other hand, in the case where it is judged that the double-clicked icon is the user icon (step S47: No route), the document being referenced by the selected user is specified by referring to the additional information stored in the visualization data storage 58 (step S53). The document being referenced by this user is also specified by referring to the additional information stored in the visualization data storage 58, and it judges whether the documents being referenced by this user and the selected user are the same (step S55) In the case where it is judged that they are not the same, the processing returns to the step S41. On the other hand, in the case where it is judged that they are the same, the processing proceeds to the step S57.

By carrying out such processing, it becomes possible to easily perform communication with the other user related through the document.

Next, a processing at the time when a conference connection request is received from a user terminal of another user will be described with reference to FIG. 22. The conference communicator 52 judges whether the conference connection request is received through the communication unit 51 (step S71). In the case where the conference connection is not requested from the user terminal of another user, a standby state continues until the conference connection request is received. On the other hand, when receiving the conference connection request, the conference communicator 52 displays the reception of the conference connection request on the display device (step S73). That is, in response to the conference connection request, an input as to whether the conference communication should be carried out is prompted. In the case where the user of the user terminal 5*a* rejects the conference connection (step S75: No route), the processing returns to the step S71. On the other hand, in the case where the user approves the conference connection (step S75: Yes route), the conference communicator 52 carries out the conference connection with the user terminal of the requesting source, and starts the communication (step S77). The conference connection and communication continue until the termination of the conference is instructed by the user (step S79). When the termination of the conference is instructed by the user, the processing returns to the step S71.

In this way, by requesting the approval of the conference connection from the user, it is possible to enable the conference connection and communication according to the convenience of the user requested to perform the conference connection.

As described above, the relation between the users of the document through the shared document can be represented, and further, if necessary, the communication with the relevant user is performed and the exchange of information can be easily realized.

A remote collaborative worker (another user) can grasp the operation state such as reference to the shared document, and when the shared document is used, it becomes possible to easily grasp that the relevant document is in what relation, and who relates to the document. In the foregoing embodiment, because the display contents displayed on the display device is based on the reference history of the user, it is possible to represent more accurate and intuitive relevance than search by keyword search or the like. Further, it is also possible to grasp that another user is referring to what document now, and whether or not the registered document is referenced by another user. By making the state relating to the user and the document reflected in real time, communication such as enquiry about the document can be performed at a suitable timing, and a smooth collaborative work can be promoted.

2. Second Embodiment

Figure 23:
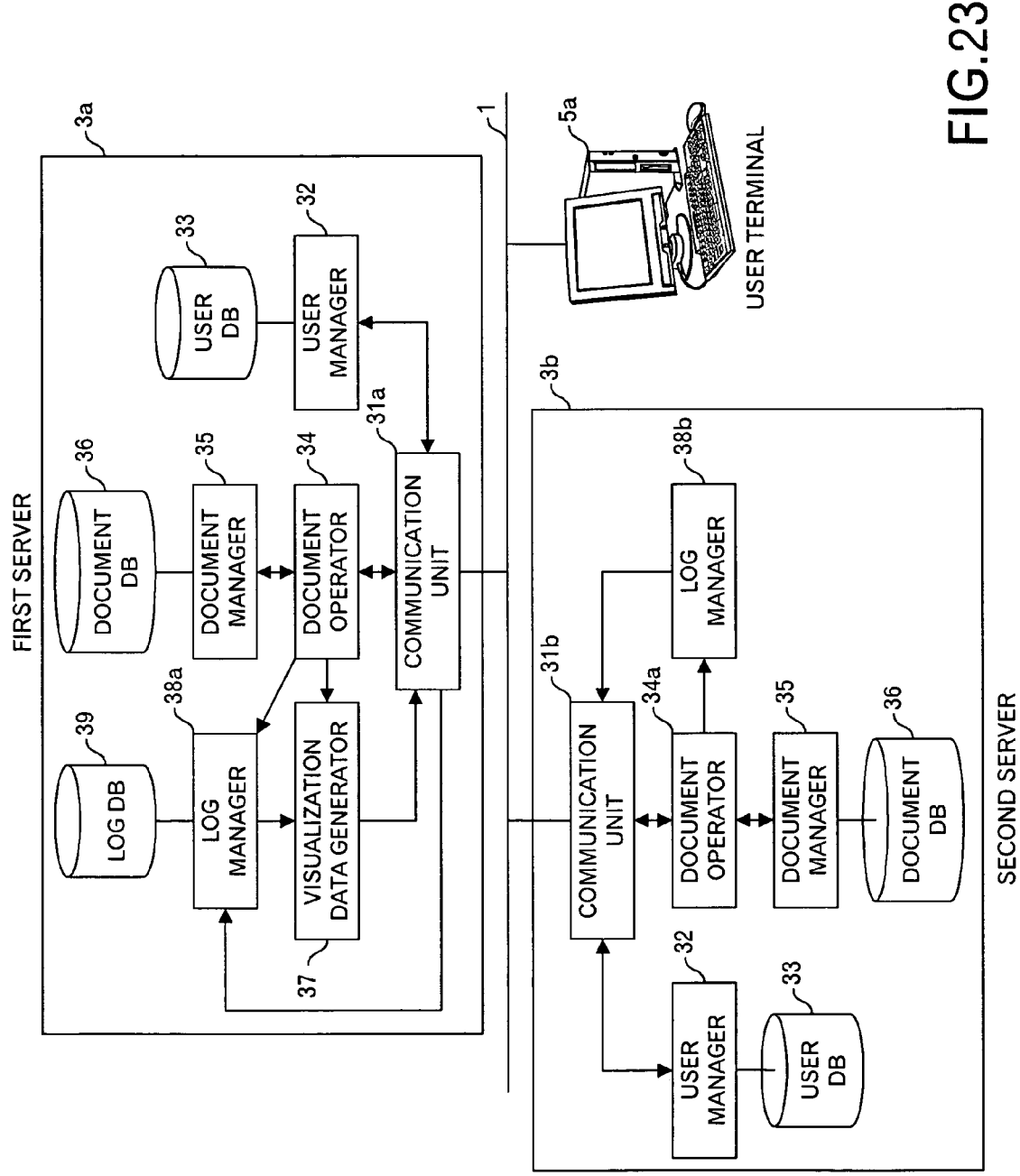
FIG. 23 is a functional block diagram of a second embodiment.

In this embodiment, a configuration example in a case where document DBs are provided in plural servers will be described with reference to FIG. 23. Incidentally, processing units having the same functions as those shown in FIG. 1 are denoted by the same reference numerals. A first server 3*a* is a parent server of plural servers connected to a network 1, and a difference from the sever 3 shown in FIG. 1 is that when receiving log data of a document operation in another server via the network 1, a communication unit 31a outputs the log data to a log manager 38a, and the log manager 38a generates a log record and stores it in a log DB 39.

On the other hand, a second server 3b is a child server connected to the network 1. Although an access to a document DB 36 and an authentication processing using a user DB 33 are identical to those of the parent server (and the server 3 of FIG. 1), the second server does not have a log DB 39. Accordingly, when a document operation is performed, data of the document operation is outputted from a document operator 34a to a log manager 38b. The log manager 38b generates log data and transmits the log data to the first server 3a through a communication unit 31b. Incidentally, in this embodiment, by the document operator 34a and the log manager 38b, log data is generated also with respect to a termination event of an operation such as a reference termination, and is registered in the log DB 39 of the first server 3a. By this processing, even if the respective servers do not have the log DB 39, functions similar to the first embodiment can be realized.

Figure 24:
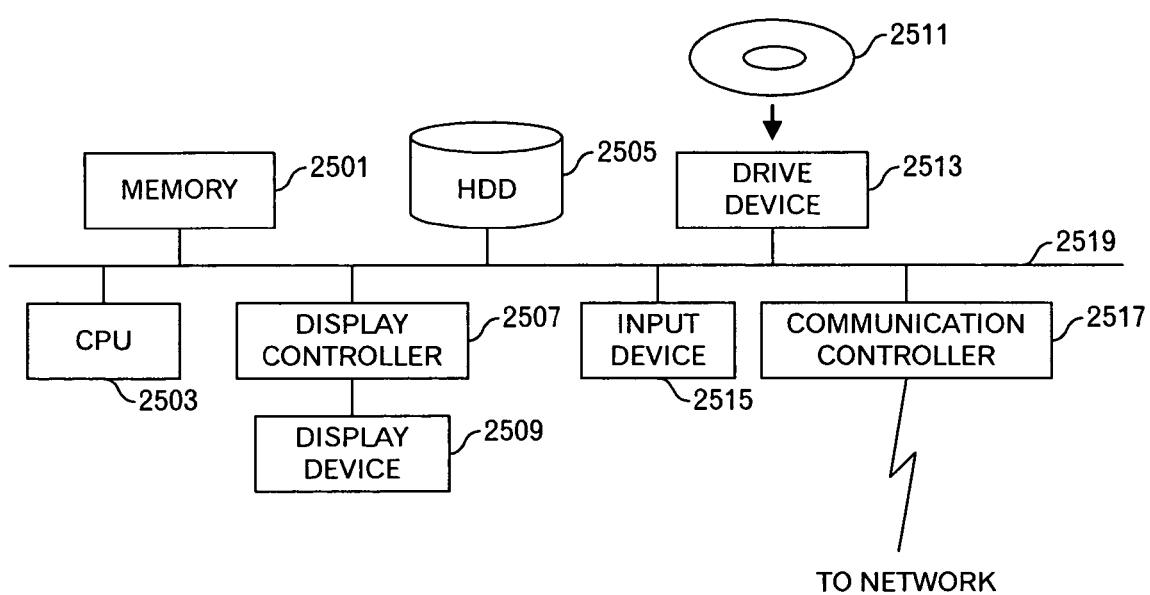
FIG. 24 is a functional block diagram of a computer.

The server 3 (3a and 3b) and the user terminal described above are computers, and the computer has a structure as shown in FIG. 24. That is, a memory 2501, a CPU 2503, a hard disk drive (HDD) 2505, a display controller 2507 connected to a display device 2509, a drive device 2513 for a removal disk 2511, an input device 2515, and a communication controller 2517 for connection with a network are connected through a bus 2519. An operating system (OS) and an application program for carrying out the foregoing processing are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operation. Besides, intermediate processing data is stored in the memory 2501, and if necessary, it is stored in the HDD 2505. In the computer as stated above, the hardware such as the CPU 2503 and the memory 2501, the OS and the necessary application program are systematically cooperated with each other, so that various functions as described above in detail are realized.

Although the embodiments of the invention have been described, the invention is not limited to these. For example, in the foregoing example, the table of the number of references is constructed by whether or not reference is made. However, the number of references is completely counted, and the value may be registered in the table of the number of references. Further, registration, reference and update are respectively weighted, and point values may be registered in the table of the number of references. Besides, the functional block diagrams shown in FIGS. 1 and 23 are to explain the contents of the functions, and there is a case where they are different from actual program modules.

Further, the conference may be a television conference, or may be a chat in which exchange of only characters is possible. Further, telephone conference may be used.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method, comprising:
    generating relational data representing a relation between a document and a user by referring to access logs generated in response to accesses to documents;
    calculating distances between users, between documents, and between said documents and said users, by using said relational data; and
    generating data of three-dimensional coordinates of said documents and said users by using the calculated distances; and
    generating display data of objects corresponding to said user and/or said document based on said three-dimensional coordinates of said documents and said users,
    wherein said display data represents relations corresponding to said distances between said users, between said documents, and between said users and said documents.

2. The information processing method as set forth in claim 1, wherein said generating said display data comprises:
    converting said data of said three-dimensional coordinates of said documents and said users based on one specific user and a document being referenced by said one specific user.

3. The information processing method as set forth in claim 1, further comprising:
    specifying a document being referenced for each user, and generating data representing a correspondence between said document and said user.

4. The information processing method as set forth in claim 3, further comprising:
    generating data concerning a number of reference users or a number of reference times for each said document by using said relational data or access logs.

5. The information processing method as set forth in claim 1, wherein said generating of said display data comprises:
    converting said three-dimensional coordinates of said documents and said users in accordance with a conversion mode that three-dimensional coordinates of a specific user and three-dimensional coordinates of a document being referenced by said specific user are converted into specific three-dimensional coordinates;
    specifying a user and/or a document included in a display range based on the converted three-dimensional coordinates of said documents and said users; and
    generating said display data of said objects corresponding to said user and/or said document in said display range based on the converted three-dimensional coordinates of said documents and said users.

6. The information processing method as set forth in claim 3, wherein said generating of said display data comprises:
    converting said three-dimensional coordinates of said documents and said users in accordance with a conversion mode that three-dimensional coordinates of a specific user and three-dimensional coordinates of a document being referenced by said specific user are converted into specific three-dimensional coordinates;
    specifying a user and/or a document included in a display range based on the converted three-dimensional coordinates of said documents and said users; and
    determining a display mode for an object corresponding to said user for each said user included in said display range based on said data representing said correspondence between said document and said user, generating display data of said object corresponding to said user based on the determined display mode and the converted three-dimensional coordinates of said user, and generating said display data for an object corresponding to said document for each said document included in said display range.

7. The information processing method as set forth in claim 6, wherein said determining comprises:
selecting a display mode of an icon corresponding to said data representing said correspondence between said document and said user for each said user included in said display range, and generating said display data of said icon based on the converted three-dimensional coordinates of said user.

8. The information processing method as set forth in claim 4, wherein said generating of said display data comprises:
converting said three-dimensional coordinates of said documents and said users in accordance with a conversion mode three-dimensional coordinates of a specific user and three-dimensional coordinates of a document being referenced by said specific user are converted into specific three-dimensional coordinates;
specifying a user and/or a document included in a display range based on the converted three-dimensional coordinates of said documents and said users; and
determining a display mode for an object corresponding to said user for each said user included in said display range based on said data representing said correspondence between said document and said user, generating display data of said object corresponding to said user based on the determined display mode and the converted three-dimensional coordinates of said user, determining a second display mode for an object corresponding to said document for each said document included in said display range based on said data concerning said number of reference users or said number of reference times, and generating display data of said object corresponding to said document based on the determined second display mode and the converted three-dimensional coordinates of said document.

9. The information processing method as set forth in claim 6, further comprising:
in response to a selection instruction of an object corresponding to a specific document, specifying a user being referring to said specific document based on said data representing said correspondence between said user and said document; and
obtaining address information of a terminal of the specified user, and transmitting a communication request to said terminal of the specified user.

10. The information processing method as set forth in claim 6, further comprising:
in response to a selection instruction of an object corresponding to a specific user, obtaining address information of a terminal of said specific user, and transmitting a communication request to said terminal of said specific user.

11. The information processing method as set forth in claim 8, further comprising:
in response to a selection instruction of an object corresponding to a specific user, judging whether or not said specific user and a user who has carried out said selection instruction are referring to a same document based on said data representing said correspondence between said document and said user; and
if it is judged that said specific user and said user who has carries out said selection instruction are referring to the same document, obtaining address information of a terminal of said specific user, and transmitting a communication request to said terminal of said specific user.

12. A computer-readable storage medium encoded with a program that when executed by a computer causes the computer to execute an information processing comprising:
generating relational data representing a relation between a document and a user by referring to access logs generated in response to accesses to documents;
calculating distances between users, between documents, and between said documents and said users, by using said relational data;
generating data of three-dimensional coordinates of said documents and said users by using the calculated distances; and
generating display data of objects corresponding to said user and/or said document based on said three-dimensional coordinates of said documents and said users,
wherein said display data represents relations corresponding to said distances between said users, between said documents, and between said users and said documents.

13. The computer-readable storage medium as set forth in claim 12, further comprising:
specifying a document being referenced for each said user, and generating data representing a correspondence between said document and said user.

14. The computer-readable storage medium as set forth in claim 13, further comprising:
generating data concerning a number of reference users or a number of reference times for each said document by using said relational data or access logs.

15. A computer system, comprising:
a unit that generates relational data representing a relation between a document and a user by referring to access logs generated in response to accesses to documents;
a unit that calculates distances between users, between documents, and between said documents and said users, by using said relational data and
a unit that generates data of three-dimensional coordinates of said documents and said users by using the calculated distances; and
a display data generation unit generates display data of objects corresponding to said user and/or said document based on said three-dimensional coordinates of said documents and said users,
wherein said display data represents relations corresponding to said distances between said users, between said documents and between said users and said documents.

16. The computer system as set forth in claim 15, wherein said display data generation unit comprises:
a unit that converts said data of said three-dimensional coordinates of said documents and said users based on one specific user and a document being referenced by said one specific user.

17. The computer system as set forth in claim 15, wherein said display data generation unit comprises:
a converter that converts said three-dimensional coordinates of said documents and said users in accordance with a conversion mode that three-dimensional coordinates of a specific user and three-dimensional coordinates of a document being referenced by said specific user are converted into specific three-dimensional coordinates;
a unit that specifies a user and/or a document included in a display range based on the converted three-dimensional coordinates of said documents and the users; and
a unit that generates said display data of said objects corresponding to said user and/or said document in said display range based on the converted three-dimensional coordinates of said documents and said users.

18. The computer system as set forth in claim 15, wherein said display data generation unit comprises:
- a unit that specifies a document being referenced for each said user, and generates data representing a correspondence between said document and said user;
- a converter that converts said three-dimensional coordinates of said documents and said users in accordance with a conversion mode that three-dimensional coordinates of a specific user and three-dimensional coordinates of a document being referenced by said specific user are converted into specific three-dimensional coordinates;
- a unit that specifies a user and/or a document included in a display range based on the converted three-dimensional coordinates of said documents and said users; and
- a unit that determines a display mode for an object corresponding to said user for each said user included in said display range based on said data representing said correspondence between said document and said user, generates display data of said object corresponding to said user based on the determined display mode and the converted three-dimensional coordinates of said user, and generates said display data for an object corresponding to said document for each said document included in said display range.

19. The computer system as set forth in claim 15, wherein said display data generation unit comprises:
- a unit that specifies a document being referenced for each said user, and generates data representing a correspondence between said document and said user;
- a unit that generates data concerning a number of reference users or a number of reference times for each said document by using said relational data or access logs;
- a unit that converts said three-dimensional coordinates of said documents and said users in accordance with a conversion mode that three-dimensional coordinates of a specific user and three-dimensional coordinates of a document being referenced by said specific user are converted into specific three-dimensional coordinates;
- a unit that specifies a user and/or a document included in a display range based on the converted three-dimensional coordinates of said documents and said users; and
- a unit that determines a display mode for an object corresponding to said user for each said user included in said display range based on said data representing said correspondence between said document and said user, generates display data of said object corresponding to said user based on the determined display mode and the converted three-dimensional coordinates of said user, determines a second display mode for an object corresponding to said document for each said document included in said display range based on said data concerning said number of reference users or said number of reference times, and generates said display data of said object corresponding to said document based on the determined second display mode and the converted three-dimensional coordinates of said document.

* * * * *